Aug. 3, 1965   M. C. FLEMING   3,198,038
INSULATION REMOVING TOOL AND METHOD
Filed April 24, 1961   2 Sheets-Sheet 1
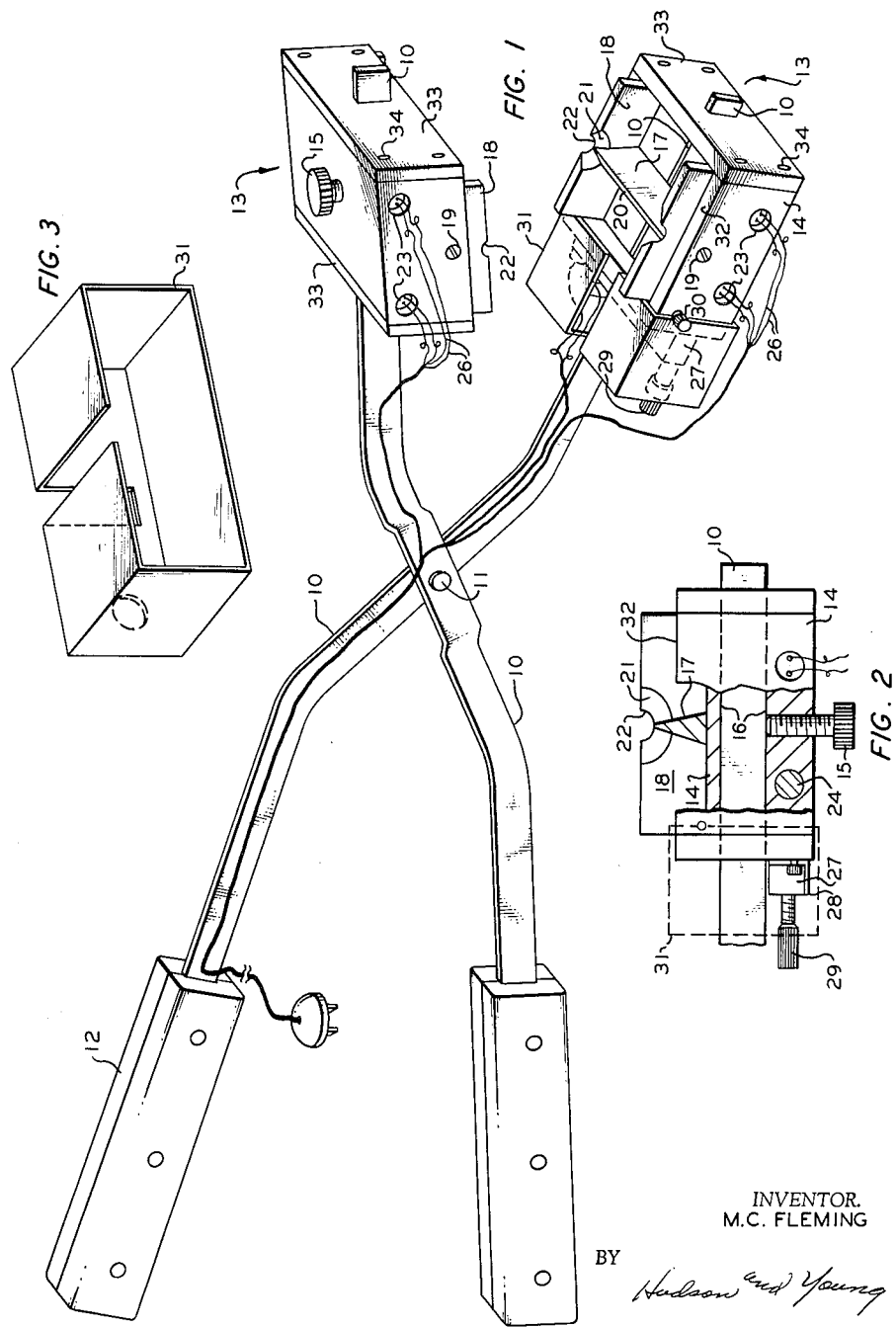
INVENTOR.
M.C. FLEMING
BY
Hudson and Young
ATTORNEYS

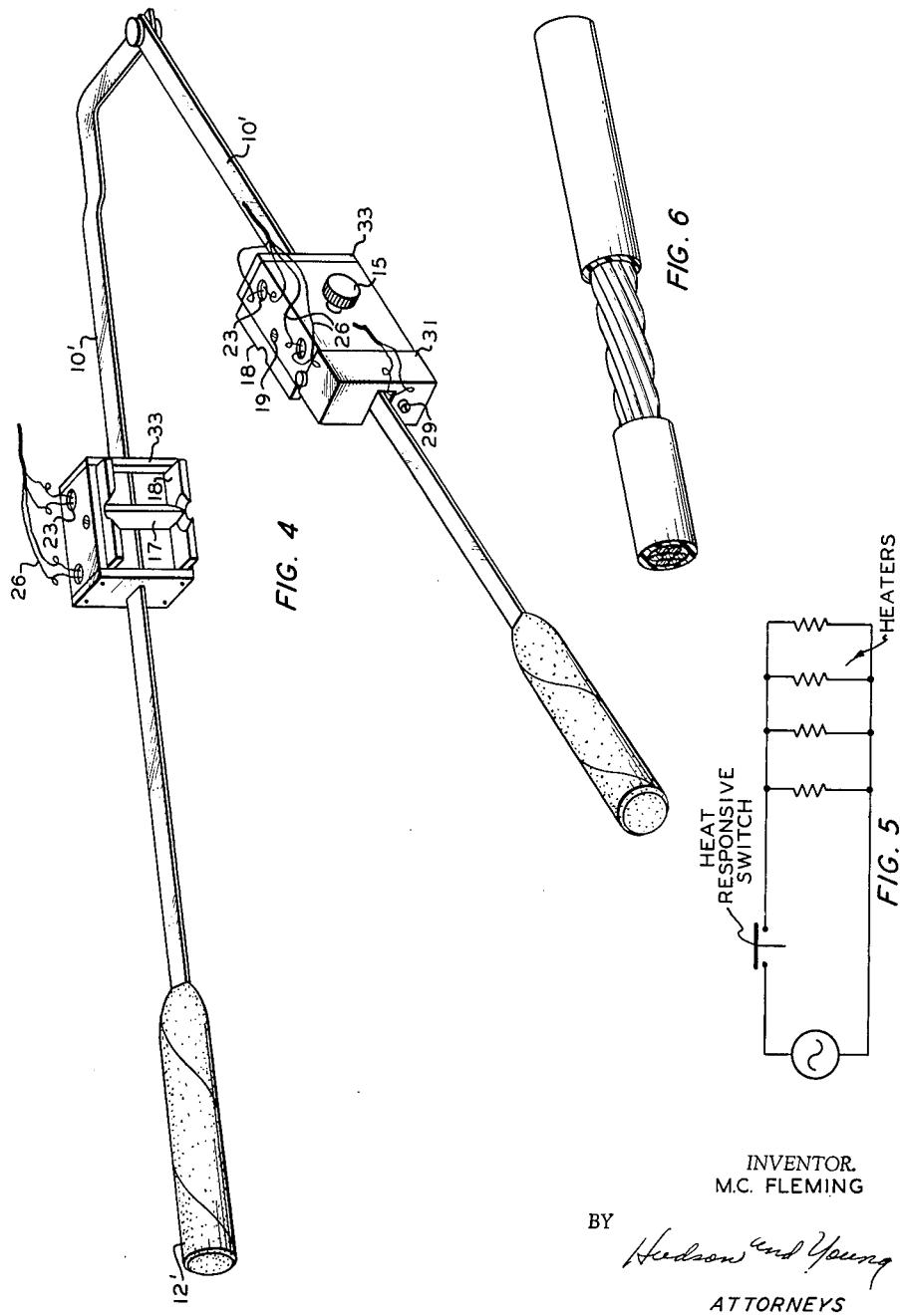

United States Patent Office 3,198,038
Patented Aug. 3, 1965

3,198,038
INSULATION REMOVING TOOL AND METHOD
Max C. Fleming, Bartlesville, Okla., assignor to Phillips
Petroleum Company, a corporation of Delaware
Filed Apr. 24, 1961, Ser. No. 105,050
6 Claims. (Cl. 81—9.5)

This invention relates to an insulation removing tool and method. In one aspect this invention relates to a tool which can be employed to remove thermoplastic insulation from electrical conductors. In another aspect this invention relates to a method of removing thermoplastic insulation from electrical conductors.

In the electrical industry it is general practice to strip insulation from electrical conductors such as wires and cables by cutting or scraping the insulation, most commonly with a pocketknife, from said conductors. In the case of small conductors there is danger of actually severing the conductor. In the case of larger conductors having relatively tough insulation, there is involved a definite inconvenience and undue waste of time in cutting away the insulation and then scraping the conductor so as to free it of adhering particles in order to provide a proper contacting surface. Many special tools have been developed for this operation. However, said special tools, like a pocketknife, depend primarily upon a cutting action, i.e., the insulation is first cut and then stripped from the conductor. Since a cutting action is involved, such tools must be carefully sized and handled in order to avoid cutting or nicking the conductor.

The recent development, acceptance, and use of high density thermoplastic materials as insulation for electrical conductors has created an urgent demand for new methods, and tools adapted for carrying out said new methods, for removing the extremely tough insulation where splicings and connections are to be made. While this is true for all conductors provided with a thermoplastic insulation, it is particularly true for large stranded conductors. Since such thermoplastic insulations are extremely tough, the stripping of the insulation with a knife or other cutting tool frequently results in nicking of the conductor which weakens the conductor and can ultimately lead to a breakage of the conductor. Thermoplastic insulations are usually applied to the conductor by an extrusion process and during its application the insulation flows into the grooves between the individual wires or strands of a stranded conductor. Thus, a knife or other tool which depends primarily upon a cutting action cannot safely be employed to remove a thermoplastic insulation from a stranded conductor. The proper application of a limited amount of heat is essential for the satisfactory removal of a thermoplastic insulation from a conductor without damage to the conductor.

The present invention provides a method, and a tool for carrying out said method, for removing thermoplastic insulation, such as polyethylene, from electrical conductors. Broadly speaking, the method of the invention comprises a combination of steps involving temporarily reducing (by the limited application of heat) the abrasion resistance of the section of insulation to be removed and then pushing said insulation from the conductor; and the tool of the invention comprises apparatus for conveniently applying said heat only where it is needed.

An object of this invention is to provide an improved method for removing thermoplastic insulation from electrical conductors. Another object of this invention is to provide a tool to facilitate the removal of thermoplastic insulation from electrical conductors in accordance with the method of the invention. Still another object of this invention is to provide a method for removing thermoplastic insulation from electrical conductors which method does not involve cutting of said insulation or scraping of said conductor. Another object of the invention is to provide a practical, low cost, light weight, quick acting tool which can be employed in removing thermoplastic insulation from electrical conductors in accordance with the method of this invention. Other aspects, objects, and advantages of the invention will be apparent to those skilled in the art in view of this disclosure.

FIGURE 1 is a perspective view of one embodiment of the insulation removing tool of the invention.

FIGURE 2 is a detailed end elevation view, partly in cross section, of one of the jaw members of the apparatus of FIGURE 1.

FIGURE 3 is a perspective view illustrating a cover plate which can be employed on the apparatus of FIGURES 1 and 4.

FIGURE 4 is a perspective view of another embodiment of the insulation removing tool of the invention.

FIGURE 5 is a wiring diagram which can be employed in the apparatus illustrated in FIGURES 1 and 4.

FIGURE 6 is a view in elevation showing a stranded conductor from which a section of the thermoplastic insulation has been removed in accordance with the method of the invention.

Referring now to the drawings, wherein like reference numerals have been employed to denote like elements, the invention will be more fully explained. In FIGURE 1 the insulation stripping tool comprises a pair of handle members 10 which are crossed and pivotally connected in conventional manner at a point 11 intermediate their ends. An insulated handle 12 is provided on one end of each of said handle members. Said handles 12 can be made of any suitable substantially non-heat conducting material and can be fabricated by bolting two pieces of said material on either side of the handle member as shown. Materials from which to fabricate said handles can be selected from any of the suitable well-known plastic materials or asbestos compositions which are commercially available. If desired, the material can be wrapped onto the handle member as illustrated in FIGURE 4. A jaw member, designated generally by the reference numeral 13, is slidably mounted on each of said handle members and said jaw members are adapted to be opened and closed with respect to each other by means of said handle members. Each of said jaw members comprises a body portion 14 provided with a transverse opening 16 therethrough which is adapted to receive one of said handle members. A set screw 15 is provided in each of said jaw members for holding same on said handle members. As illustrated, the inner or meeting face of each of said jaw members is recessed.

A die insert comprising a tapered longitudinal blade member 17 and a pair of transverse blade members 18 is disposed in the recessed inner face of each jaw member and is held therein by means of set screws 19 at each end. Said longitudinal blade member is tapered so as to provide a narrow land 20 at its leading or insulation contacting edge. Each of said transverse blade members is provided with a semi-circular tapered mid-portion 21 which tapers to a narrow land 22 at its leading or insulation contacting edge. It will be noted that said transverse blade members 18 are arranged perpendicular to the ends of said longitudinal blade member 17 with the bottom of semi-circular land 22 being coincident with land 20 of said longitudinal blade member 17.

A pair of longitudinally disposed openings 23 are provided in the body of each said jaw member 13 adjacent its outer face. Said openings 23 are preferably cylindrical in shape, but can be any suitable shape, and preferably extend essentially completely through the body of said jaw member. An electrical heater element 24 is disposed in each of said longitudinal openings 23. Said heater elements 24 are commercially available items and, per se, form no part of the invention. One example of a suitable heater element is the Hotwatt heater No. SC-3725, available from Hotwatt, Inc. of Danvers, Massachusetts. Said heater is a 110 watt, 110 volt heater and is about 3/8 inch in diameter and 2.5 inches long. Said openings 23 and said heater elements 24 are sized so that said heaters 24 form a friction fit with said openings 23. A pair of lead wires 26 is provided for supplying electrical current to each of said heater elements. FIGURE 5 illustrates a suitable wiring diagram for the electrical lead wires to the four heaters disposed in the two jaw elements. A suitable conventional heat responsive switch 27 is mounted on and adjoins the jaw of one of said jaw members and is connected into one of the lead wires leading to each of said heaters 24 for controlling said heaters. Said heat responsive switch 27, per se, forms no part of this invention. One suitable type is a Fenwal Series 30002 Thermoswitch available from the Fenwal Company of Ashland, Massachusetts. Said heat responsive switch can be mounted on said jaw member in any suitable manner as by means of mounting bracket 28 attached to the body of the jaw member by means of the set screw shown. Adjusting screw 29 is provided on said switch for setting and adjusting the control point thereof. The particular switch described above has a control range extending from about 50 to about 600° F., and a control characteristic ranging from 1 to 5° F. depending upon the electrical and thermal characteristics of the system in which it is employed. A protective cover 31, shown in perspective view in FIGURE 3, can be provided for protecting said thermoswitch if desired. When employed said cover is attached to the body of the jaw member at each end by a screw 30.

Said jaw members 13 are comprised essentially of a block of metal which has been machined to provide the recess in the inner face thereof and leave the two upstanding end portions 32 which extend above said recess. The transverse opening 16 is then machined into the body of the jaw member with the "top" of said transverse opening being coincident with the "bottom" of said recess (as seen in FIGURE 1). The jaw member body is completed by providing two side plates 33 which are attached to the ends 32 by means of screws 34. It is also within the scope of the invention to provide jaw members 13 which have been cast or molded to be integral, thus eliminating end plates 33. In such instances transverse opening 16 can be drilled cylindrical, and round handle members 10 can be used. If desired, said round handles can be hollow and the electrical lead wires 26 passed through said hollow handles.

The die insert disposed in the inner face of each jaw member can be made of separate longitudinal blade members 17 and transverse blade members 18. In such instance the die insert can be assembled in place in the recess and held in position by screws 19 which would be long enough to extend through the upstanding end portion 32 of the body of the jaw member, through transverse blade member 18, and into longitudinal blade member 17. However, it is presently preferred to fabricate the die insert an integral unit as by silver soldering or by brazing the transverse blade members across the ends of the longitudinal blade member.

Referring now to FIGURE 4, in the embodiment of the invention there illustrated the handle members 10' are not crossed but are pivotally connected at one end of each. As shown, one of said handle members 10' is offset or bent adjacent its pivoted end so as to accommodate the closing of the inner or meeting faces of the two jaw members. FIGURE 4 also illustrates another type of insulated handle 12' which can be employed on the handle members.

In practice, the method of the invention is carried out by a combination of well-defined steps. First, the abrasion resistance of the section of thermoplastic insulation which is to be removed is temporarily reduced by applying a limited amount of heat only where it is needed, i.e., to the section of insulation which is to be removed. This is done by preheating the die inserts to a temperature above the softening point but below the melting point of the insulation. This application of heat is brought about by contacting the section of insulation to be removed with the longitudinal die member 17 and simultaneously contacting said section of insulation at each end thereof with the semi-circular portion of the transverse die members 18. Secondly, as soon as the insulation material has softened under contact of the hot surfaces of the die members, a slight pressure is exerted upon the handle members which causes said die members to penetrate the insulation substantially to the metal conductor. This penetration of the insulation forms two longitudinal grooves in the insulation and also forms two semi-circular grooves in said insulation at the ends of said longitudinal grooves. In the next step of the method, the tool is opened and rotated approximately 90° around the cable. The tool is again closed and a second set of longitudinal and transverse grooves are formed in the manner just described. After the second set of grooves has been formed the cable is held rigid and the heated section of insulation quickly removed therefrom by rotating the closed tool around the cable while holding said tool in the closed position. The softened section of insulation separates easily at said grooves and is pushed away from the metal conductor by the contacting edges of the longitudinal die members, leaving the metal conductor clean and ready for a splice or connection.

It is believed the advantages of the invention will be apparent to those skilled in the art in view of the above description. The invention provides a practical, low cost, light weight, quick acting tool which is adapted for carrying out the method of the invention without any actual cutting operations upon the insulation. The absence of any cutting action is an outsanding feature of the invention because it eliminates all danger of severing or nicking the metal conductor.

The tool or apparatus of the invention can be fabricated of any suitable material. It has been found convenient to fabricate the body of the jaw members from aluminum because of its light weight and superior heat conducting properties. The die members can be fabricated from any suitable type of material, generally a mild steel, or a stainless steel being employed if desired. Said tool or apparatus can be of any convenient size.

Another advantage of the invention is that due to the lack of any cutting action the invention can be fabricated in specific embodiments or models capable of handling a wide range of wire or cable sizes. For example, in one specific embodiment of the invention which was particularly fabricated for working on No. 6 through No. 1-10 inclusive cables the longitudinal blade member 17 of the die insert was about 2.1 inches long, the transverse die members 18 were about 1.5 inches long, and the radius of the semi-circular land 22 was about 0.166 inch. The contacting edges of all of said die members were provided with a 1/64 inch land. The remainder of the dimensions of the apparatus are, of course, proportional to those given above. It is to be understood, of course, that the above dimensions are given as examples only and may be varied as desired.

While polyethylene has been mentioned as an example of one type of thermoplastic insulation which is used on electrical cables or conductors, the invention is not limited to the removal of polyethylene insulations. Any type of thermoplastic insulation of reasonable softening point can be removed according to the invention.

While certain embodiments of the invention have been described for illustrative purposes, the invention obviously is not limited thereto. Various other modifications will be apparent to those skilled in the art in view

I claim:

1. A thermoplastic insulation removing tool comprising: a pair of pivotally connected handle members; an insulated handle provided on one end of each said handle members; a jaw member slidably and adjustably mounted on each of said handle members, said jaw members being adapted to be opened and closed with respect to each other by means of said handle members; each of said jaw members comprising a body provided with a transverse opening therethrough adapted to receive one of said handle members; a recess formed in the inner face of each of said jaw members; an integrally formed die insert, said die insert comprising a tapered longitudinal blade member provided with a flat narrow land at its insulation contacting edge and a pair of transverse blade members arranged perpendicular to the ends of said longitudinal blade member, a semi-circular tapered portion having a flat narrow land at its insulation contacting edge at the mid-point of each transverse blade member being coincident at said edge with said contacting edge of said longitudinal blade member; a pair of longitudinal openings provided in the body of each said jaw member adjacent its outer face; an electrical heater element disposed in each of said longitudinal openings; lead wires for supplying electric current to each of said heaters; and a heat responsive switch mounted on and adjoining the body of one of said jaw members and connected into one of said lead wires to each of said heaters for controlling said heaters.

2. An insulation removing tool according to claim 1 wherein said handle members are crossed at an intermediate point of each and are pivotally connected at said crossing, and said jaw members are mounted on the opposite end portion of said handle members from said insulated handles.

3. An insulation removing tool according to claim 1 wherein said handle members are pivotally connected at one end of each, and said jaw members are mounted on said handle members between said pivot point and said insulated handles.

4. A method for removing thermoplastic insulation from an electrical conductor, which method comprises: contacting a section of the insulation on said conductor with a longitudinal die member; simultaneously contacting said section of insulation at each end thereof with a semi-circular transverse die member; temporarily reducing the abrasion resistance of said section of insulation by applying a limited amount of heat to said insulation through said die members until a slight pressure on said die members will cause same to penetrate said insulation substantially to said conductor; withdrawing said die members from said insulation; again contacting said section of insulation with said die members at contacting points about 90 degrees removed from said first contacting points; again applying a limited amount of heat to said insulation through said die members until a slight pressure on said die members will cause same to penetrate said insulation substantially to said conductor; and then rotating said die members around said conductor to remove said insulation.

5. A method for removing thermoplastic insulation from an electrical conductor, which method comprises: contacting a section of the insulation on said conductor with a longitudinal die member mounted in a hand held electrically heated tool; simultaneously contacting said section of insulation at each end thereof with a semi-circular transverse die member also mounted in said tool; temporarily reducing the abrasion resistance of said section of insulation by applying a limited amount of heat to said insulation through said die members until a slight pressure on said die members will cause same to penetrate said insulation substantially to said conductor; withdrawing said die members from said insulation; again contacting said section of insulation with said die members at contacting points about 90 degrees removed from said first contacting points; again applying a limited amount of heat to said insulation through said die members until a slight pressure on said die members will cause same to penetrate said insulation substantially to said conductor; and then rotating said die members around said conductor to remove said insulation.

6. A thermoplastic insulation removing tool comprising: a pair of pivotally connected handle members; an insulated handle provided on one end of each of said handle members; a jaw member slidably and adjustably mounted on each of said handle members, said jaw members being adapted to be opened and closed with respect to each other by means of said handle members; each of said jaw members comprising a body provided with a transverse opening therethrough adapted to receive one of said handle members; a recess formed in the inner face of each of said jaw members; an integrally formed die insert, said die insert comprising a tapered longitudinal blade member provided with a flat narrow land at its insulation contacting edge and a pair of transverse blade members arranged perpendicular to the ends of said longitudinal blade member, a semi-circular tapered portion having a flat narrow land at its insulation contacting edge at the mid-point of each transverse blade member being coincident at said edge with said contacting edge of said longitudinal blade member; and an electrical heater element disposed in each of said bodies.

References Cited by the Examiner

UNITED STATES PATENTS

| 562,097 | 6/96 | Reickel. | |
|---|---|---|---|
| 785,392 | 3/05 | Williams | 81—9.5 |
| 880,790 | 3/08 | Goehst | 81—9.5 |
| 1,019,835 | 3/12 | Prack | 81—9.5 |
| 1,022,679 | 4/12 | Huston | 81—9.5 |
| 1,406,486 | 2/22 | Perlman | 81—9.5 |
| 1,595,799 | 8/26 | Massingham | 81—9.51 |
| 2,001,538 | 5/35 | Mueller et al. | 219—221 |
| 2,293,178 | 8/42 | Stocker | 83—16 |
| 2,516,609 | 7/50 | Woodward | 83—16 |
| 2,734,984 | 2/56 | Brunner | 219—21.4 |
| 3,040,159 | 6/62 | Lindemann et al. | 81 |

FOREIGN PATENTS 920,918  12/54  Germany.

OTHER REFERENCES

Hampel: German application 1,046,133, printed Dec. 11, 1958 (KL 21c 7/05).

WILLIAM FELDMAN, *Primary Examiner.*

MAX L. LEVY, RICHARD M. WOOD, *Examiners.*